United States Patent
Oono et al.

[11] Patent Number: 6,040,677
[45] Date of Patent: Mar. 21, 2000

[54] APPARATUS FOR DRIVING STEPPER MOTOR OF CAMERA

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 09/020,849

[22] Filed: Feb. 9, 1998

[30] Foreign Application Priority Data

Feb. 10, 1997 [JP] Japan ................................ 9-026897

[51] Int. Cl.⁷ .................................................. H02P 8/00
[52] U.S. Cl. .......................... 318/696; 318/685; 396/132; 396/135
[58] Field of Search ..................... 318/696, 685, 318/362–382; 396/133, 135, 132

[56] References Cited

U.S. PATENT DOCUMENTS

| 4,812,727 | 3/1989 | Sakai et al. | 318/696 |
| 5,117,137 | 5/1992 | Kobayashi | 310/49 R |
| 5,126,896 | 6/1992 | Yamagata | 360/78.04 |
| 5,594,311 | 1/1997 | Yasuda et al. | 318/696 |

*Primary Examiner*—David Martin
*Attorney, Agent, or Firm*—Greenblum & Bernstein, P.L.C.

[57] ABSTRACT

A stepping motor driving apparatus for a camera having a 1–2 phase excitation type stepping motor which is driven by a 1–2 phase excitation in response to a drive signal includes a drive control device for stopping the stepping motor at a 1-phase excitation position by de-energizing the stepping motor at the 1-phase excitation position and for stopping the stepping motor at a 2-phase excitation position while maintaining the excitation in a high precision drive control in which the stepping motor is driven at high precision. The drive control device stops the stepping motor by de-energizing the stepping motor always at the 1-phase excitation position in a normal drive control in which no precise drive control of the stepping motor is needed.

13 Claims, 10 Drawing Sheets

APPARATUS FOR DRIVING STEPPER MOTOR OF CAMERA

BACKGROUND OF THE INVENTION

1. Field of the Invention

The present invention relates to an apparatus for driving a stepping (stepper) motor, particularly incorporated in a digital still camera.

2. Description of the Related Art

Recently cameras have been employing a motor for driving the autofocus system. In the case of a DC motor, a relative position detecting means which detects a relative position with respect to a reference position using an encoder or the like is used as a means for detecting a position of a focusing lens. It is necessary to provide a space in which the encoder is accommodated in the camera. Also, a means for detecting the output of the encoder must be incorporated in the camera.

To this end, it is possible to use a stepping motor (stepper motor) in which the angular displacement can be controlled stepwise in the auto-focusing system for a photographing lens. In a 1–2 phase excitation system stepping motor (half-step drive system) which has a large rotational torque and a simple control circuit, if the power supply is stopped at a 1-phase excitation position, i.e., if no excitation occurs, the rotor is stopped at the 1-phase excitation position (detent position). However, if the power supply is stopped at a 2-phase excitation position, the rotor is in an equilibrium state between the detent positions and hence, the rotor tends to rotate to one of the detent positions. Consequently, if the excitation is ceased at the 2-phase excitation position, the rotor rotates to and stops at a detent position adjacent to the 2-phase excitation position (equilibrium position, stable position), thus resulting in an occurrence of an error in the stop position. In order to prevent this, it is necessary to hold the 2-phase excitation to maintain the equilibrium position when the power supply is ceased at the 2-phase excitation position. This invites an increase in the power consumption.

Furthermore, in recent digital cameras or digital still cameras, a CCD image pickup device has been used in place of a silver-halide film. In general, the latitude of the CCD image pickup device is narrower than that of the silver-halide film, and hence it is necessary to precisely adjust the quantity of exposure light or the focus upon photographing. However, if, for example, a photographer views an object through an optical finder or liquid crystal display, when no photographing operation is carried out, the latitude is such that the user cannot be aware of any blurriness.

It is an object of the present invention to provide a drive apparatus for a stepping motor of a camera, in which a precise focus control can be effected and the power consumption of a 1–2 phase excitation stepping motor can be reduced.

SUMMARY OF THE INVENTION

To achieve the object mentioned above, according to an aspect of the present invention, there is provided a stepping motor driving apparatus for a camera having a 1–2 phase excitation type stepping motor which is driven by a 1–2 phase excitation in response to a drive signal. The stepping motor driving apparatus has a drive controller for stopping the stepping motor at a 1-phase excitation position by de-energizing the stepping motor at the 1-phase excitation position and for stopping the stepping motor at a 2-phase excitation position while maintaining the excitation in a high precision drive control in which the stepping motor is driven at high precision. The control means stops the stepping motor by de-energizing the stepping motor always at the 1-phase excitation position in a normal drive control in which no precise drive control of the stepping motor is needed.

If the stepping motor is a stepping motor which is adapted to move a focusing lens group of a photographing lens or open or close a diaphragm of the photographing lens, the drive controller drives the stepping motor according to the high precision drive control upon photographing, and drives the stepping motor according to the normal drive control for operations other than the photographing operation.

If the stepping motor driving apparatus is provided in a digital still camera which is provided with a CCD image pickup device, a memory in which the image data produced by the CCD image pickup device is stored, and a liquid crystal display in which the image data is displayed. The drive controller drives the stepping motor according to the high precision drive control when the image data is written in the memory and drives the stepping motor according to the normal drive control when the image data is displayed in the liquid crystal display but is not recorded in the memory.

With this arrangement, the stop position of the stepping motor(s) can be precisely controlled using one-step angular units for the photographing operation in which the stepping motor(s) need to be highly precisely controlled, and for operations other than the photographing operation in which no precise control is needed, the stepping motor(s) can be stopped at the detent position every other step angle. Thus, the power consumption can be reduced.

The present disclosure relates to subject matter contained in Japanese Patent Application No. 09-26897 (filed on Feb. 10, 1997) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

The drawings show an embodiment of the present invention applied to a digital camera having a power zoom lens.

The digital camera is essentially composed of a zoom lens portion having a zoom lens and a CCD image pickup device, and a camera portion having an image storage device such as a flash memory and a color LCD (liquid crystal display).

Figure 1:
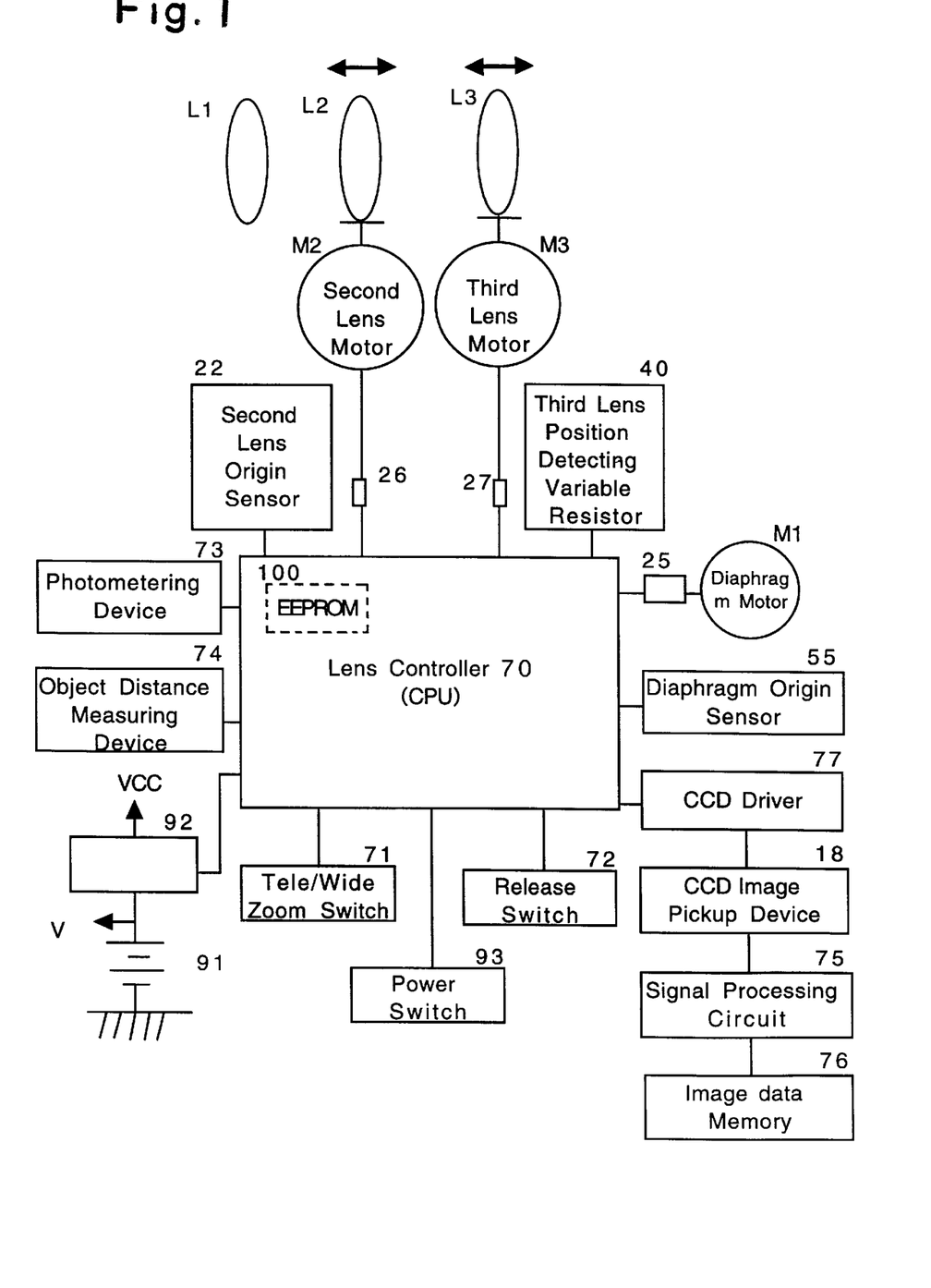
FIG. 1 is a block diagram of a digital still camera to which the present invention is applied.

The lens control system provided in the zoom lens portion will be explained below with reference to FIG. 1. Connected to the lens controller (CPU) 70 is a diaphragm stepping motor (first motor) Ml for driving the diaphragm, a second lens stepping motor (second motor) M2 for driving a second lens group L2 of the zoom lens; a third lens motor (third motor) M3 for driving the third lens group L3 of the zoom lens through motor drivers 25, 26 and 27, respectively. The stepping motors M1, M2, and M3 are each made of a 1–2 phase excitation stepping motor.

Moreover, connected to the lens controller 70 is a second lens initial position sensor 22 for detecting the origin of the second lens group L2, a third lens volume 40 for detecting the absolute position of the third lens group L3, a diaphragm initial position sensor 55 for detecting the initial position (full-open position) of the diaphragm, a color image pick-up device (CCD) 18, a zoom switch 71 having a tele-switch and/or wide-switch, a release switch 72, a photometering device 73 for measuring the object brightness, and an focus detecting device 74 for detecting the object distance are connected to the lens CPU 70. The photometering device 73 is usually constituted by the CCD 18 but is shown as a separate member for clarity. The focus detecting device 74 can be either a passive type or an active type. In the illustrated embodiment, a passive type of focus detecting device 74 is used to detect the defocus.

The CCD image pickup device 18 is driven by a CCD driver 77 and converts an optical object image formed thereon into an electrical image signal which is transmitted to the signal processing circuit 75. The signal processing circuit 75 converts the electrical image signal input thereto into digital image data which is recorded in an image-data memory 76. A built-in flash memory or a detachable memory card, can be used as a recording medium for the image-data memory 76.

A battery 91 which supplies electric power to the electronic devices mentioned above is provided in the camera body, so that when the power switch 93 is turned ON, the power is supplied to the electronic devices of the zoom lens portion directly or through a regulator 92. For clarity, it is assumed that these devices are provided in the zoom lens and that the power switch 93 is connected to the controller 70, so that when the latter is turned ON, the power can be supplied to the electronic devices through the regulator 92.

In the illustrated embodiment, the zoom lens is composed of a first positive stationary lens group L1, a second negative movable lens group L2 and a third positive movable lens group L3. This lens system is of a variable focus type in which the zooming operation is carried out by moving the second and third lens groups L2 and L3 and the focusing operation is carried out by moving the second lens group L2. However, no cam groove is used to control the relative position of the second and third lens groups L2 and L3. The positions of the second lens group L2 and the third lens group L3 are controlled in an open loop and a closed loop, respectively, in accordance with the set focal length data (position data of the second lens group L2) and the object distance data (object distance). Note that, for clarity, in the illustrated embodiment, the second lens group L2 is referred to as a focusing lens group, the second lens stepping motor M2 is referred to as a focusing motor, the third lens group L3 is referred to as a zoom lens group, and the third lens motor M3 is referred to as a zoom motor, respectively.

The stepping motors MI, M2 and M3 are each made of a 1–2 phase excitation stepping motor. The stepping motors are stopped at any detent positions (1-phase excitation position) when the excitation is ceased. Namely, if the power supply is ceased in the 1-phase excited state, the rotational shaft (rotor) is stopped at that position, and if the power supply is ceased in the 2-phase excited state, the rotational shaft (rotor) can be stopped at that position, but in many cases, the rotor is rotated to the adjacent 1-phase excitation position in the clockwise direction or counterclockwise direction and is stopped at that detent position.

In the illustrated embodiment, the stepping motors M1, M2, M3 are always stopped at the 1-phase excitation position (detent position). Consequently, the drive (excitation) of the stepping motors M1, M2 and M3 is controlled so that the 2-phase excitation always takes place first and the excitation is ceased at the 1-phase excitation position. Namely, the drive is always controlled at a two-step angular displacement (unit displacement).

The principle behind the configuration and the driving of the 1–2 phase (variable-phase) excitation type stepping motor which is employed in the present invention will be explained below with reference to FIGS. 9A, 9B, 9C and 10.

The drive circuit for this type of stepping motor receives electric pulses, causing the rotor to rotate in the clockwise direction in the following order: terminals (A0~A1) and (B0~B1) (2-phase [twin-phase-group] excitation), terminals (B0~B1) (1-phase [single-phase-group] excitation), terminals (B0~B1) and (A1~A0) (2-phase [twin-phase-group] excitation), terminals (A1~A0) (1-phase [single-phase-group] excitation), terminals (A1~A0) and (B1~B0) (2-phase [twin-phase-group] excitation), and terminals (A0~A1) (1-phase [single-phase-group] excitation).

When the power is cut off at the 1-phase excitation position, (e.g., as in FIGS. 9A or 9C) since the north and south poles of the rotor 111 are attracted to the poles 103A and 103a of the stator 101, the rotor stops at that position (the 1-phase excitation position). In other words, the 1-phase excitation position is in a detent position that can maintain a stationary rotor position even when excitation is ceased.

Figure 9A:
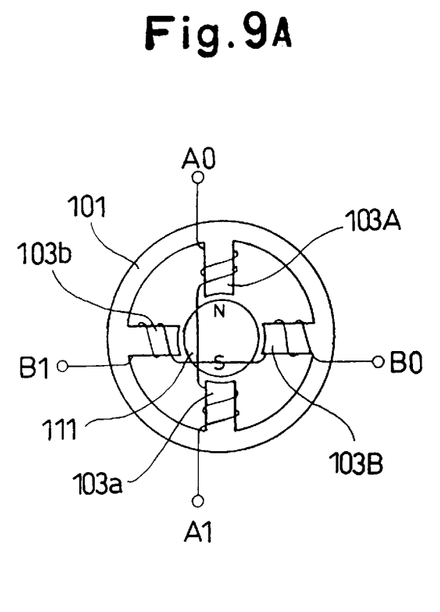
FIGS. 9A, 9B and 9C show the principle configuration and driving of a variable-phase excitation type stepping motor.
Figure 9B:
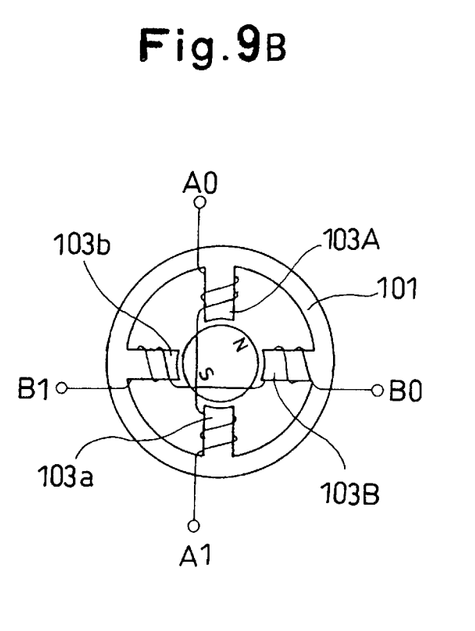
Figure 9C:
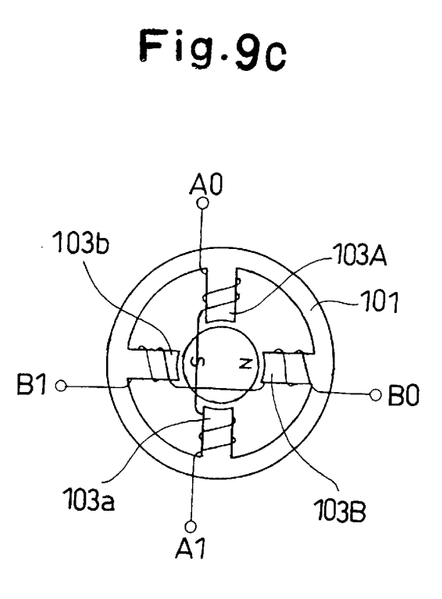
Figure 10:
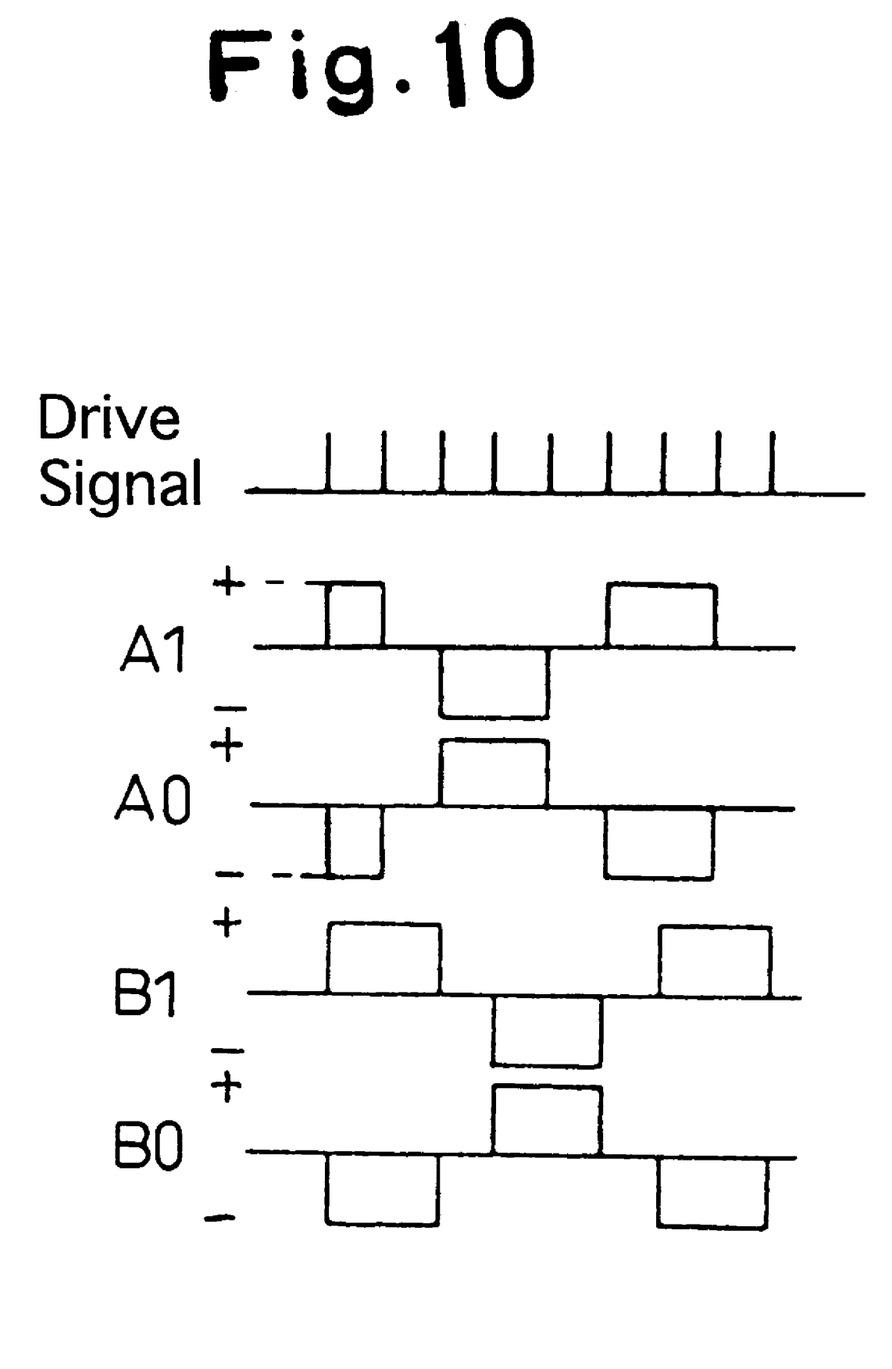
FIG. 10 is a timing chart of the variable-phase excitation type stepping motor shown in FIGS. 9A, 9B and 9C.

However, in the 2-phase excitation position of FIG. 9B, since the north pole of the rotor is attracted to poles 103A and 103B, and the south pole of the rotor is attracted to poles 103a and 103b, the north and south poles of the rotor 111 stop in between the neighboring poles 103A, 103B and 103a and 103b, respectively. When the power is cut off at the 2-phase excitation position, the north and south poles are attracted to one of the neighboring poles 103A, 103B and 103a, 103b, respectively. Hence, the rotor 111 rotates to one of each pair the above-mentioned neighboring poles of stator 101, and stops. In other words, the 2-phase excitation position is an 'equilibrium state' whereby the rotor 111 rotates to one of each pair of the neighboring detents when excitation is terminated.

It must be noted that the above explanation of the 1–2 phase excitation stepping motor explains the main principle and does not limit the scope thereof.

The number of the pixels of the LCD incorporated in the digital still camera as a view finder is usually less than that of the CCD image pickup device 18. Therefore, if there is a focal-shift to the extent corresponding to an angle of a few steps (step angles) of the second lens stepping motor M2, a blurring of the image can hardly be recognized by the naked eye. However, the image data produced by the CCD image pickup device 18 is influenced by a blurred image. Likewise, for the diaphragm, when the image is viewed through the LCD, an exposure error is hardly recognized, but the blurriness is reflected on the picked-up image data.

To prevent this, in the present invention, the motors M1 and M2 are driven accurately by a one-step angular displacement during the photographing operation, but when no photographing operation is effected, the motors M1 and M2 are driven by an even number step angular displacement.

For instance, the lens controller 70 performs the focus and diaphragm control at an angular displacement precision of one step (integer pulses) of the motors M1, M2 and M3 when the release switch 72 is turned ON, i.e., upon photographing. Namely, the number of drive pulses is set in accordance with the diaphragm value which varies when the stepping motors M1 and M2 rotate by one-step angular units and the displacement of the second lens group L2.

When the release switch 72 is OFF, the lens controller 70 performs the diaphragm and focus control at an angular displacement precision of two steps (even numbers of pulses) of the motors M1 and M2. In the illustrated embodiment, the third stepping motor M3 chiefly functions to change the focal length and hence, even if it is driven at an angular displacement precision of two steps, there is no danger of the image data being adversely influenced. Therefore, the third motor is driven always at an angular displacement precision of two steps. Alternatively, it is possible to carry out the fine adjustment of the third motor at an angular displacement precision of one step upon photographing.

Figure 2:
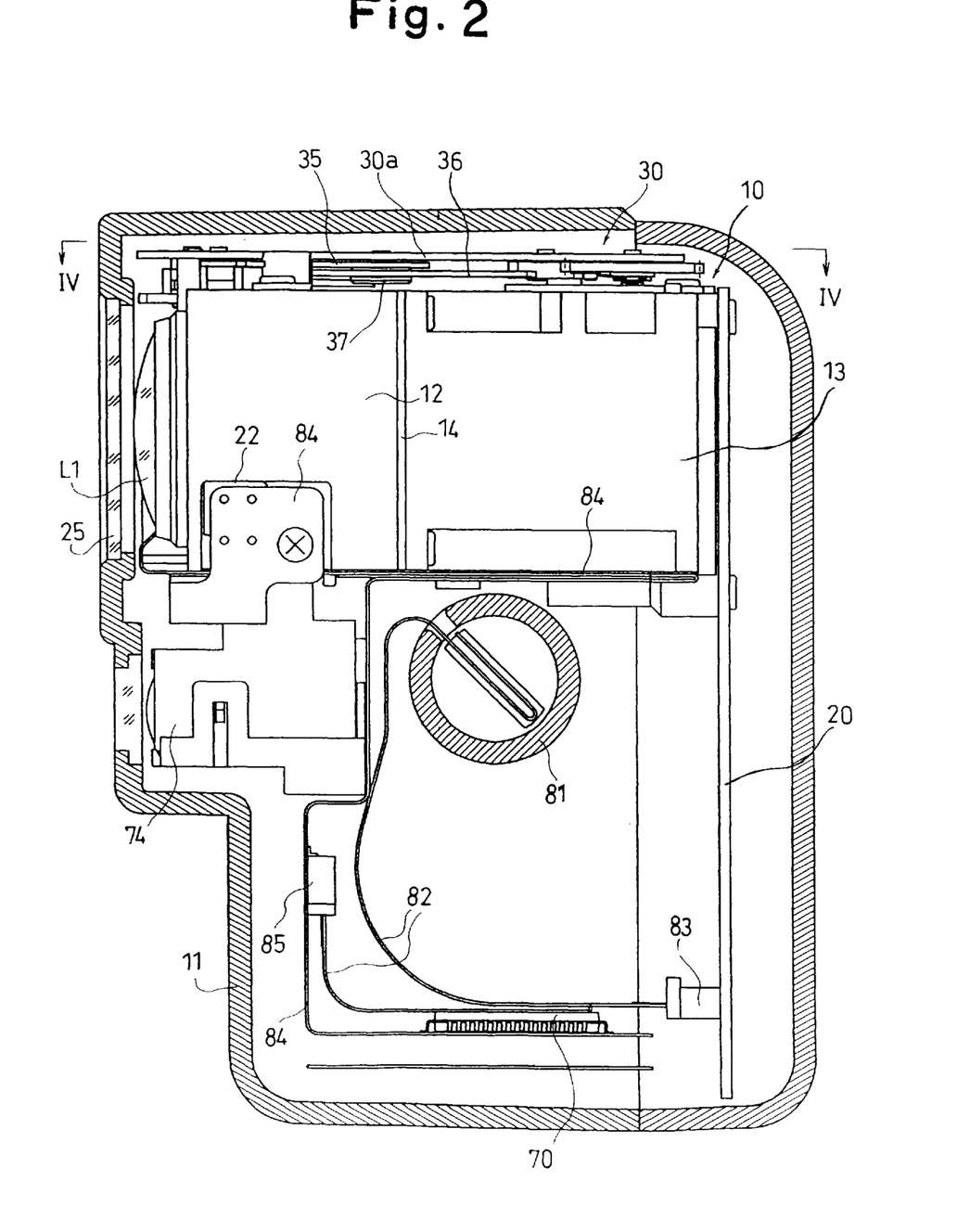
FIG. 2 is a left side view of a zoom lens portion in which the casing is sectioned.
Figure 5:
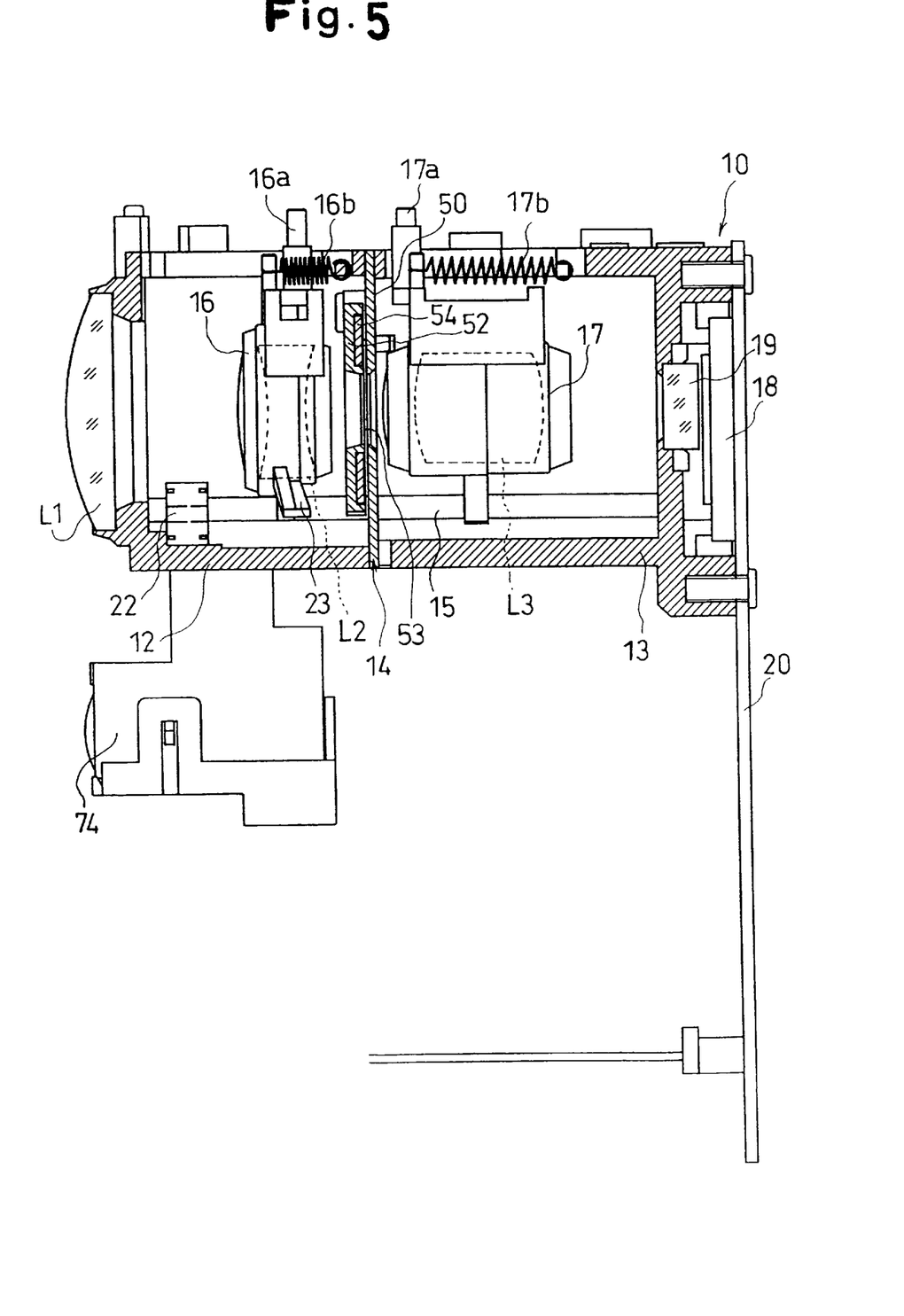
FIG. 5 is a partially longitudinally sectioned left side view of the lens unit before a lens drive unit is incorporated, shown in a telephoto position.

The mechanical structure of the zoom lens to which the present invention is applied will be explained below. The lens barrel body 10 provided in the lens casing 11 is essentially composed of a front plastic body 12, a rear plastic body 13 and a diaphragm block 14 held between the front and rear plastic bodies 12 and 13. There are a plurality of guide rods 15 (only one of which is shown in FIG. 5) which extend in parallel with the optical axis and by which a second lens frame 16 which holds the second lens group L2 and a third lens frame 17 which holds the third lens group L3 are movably guided. The CCD 18 is located behind the third lens frame 17 and is secured to the rear body 13 through the substrate 20 thereof. 19 designates the crystal filter. The casing 11 is provided with a glass cover (plane-parallel plate) 25 (FIGS. 2 and 3) secured thereto and located in front of the first lens group L1.

The second lens frame 16 and the third lens frame 17 are respectively provided with upwardly extending second and third lens pins 16a and 17a. The second and third lens frames 16 and 17 are biased rearward (toward the CCD 18) by tensile springs 16b and 17b for removing backlash.

The front body 12 is provided with a photodetector (initial position sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog plate 23 interrupts the light from the photodetector 22 to detect the origin. The movement of the second lens group L2 from the origin is controlled by the lens controller 70 in accordance with the number of pulses for driving the second lens group L2. Alternatively, it is also possible to control the movement of the second lens group L2 from the origin using a pulser.

As may be supposed from the telephoto position shown in FIG. 5, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved always in opposite directions.

The drive mechanism which drives the second lens frame 16 and the third lens frame 17 within the lens barrel body 10 is assembled as a lens drive unit 30 and is mounted to bridge the front body 12 and the rear body 13. The second lens stepping motor M2 and the third lens stepping motor M3 are secured to the lower surface of the second mother plate (substrate) 32 so that the output shafts of the stepping motors M2 and M3 extend perpendicularly to the second substrate 32. The second drive plate 35 which is provided with a cam groove (lead groove) in which the second lens pin 16a of the second lens frame 16 is fitted and a third drive plate 36 which is provided with a cam groove (lead groove) in which the third lens pin 17a of the third lens frame 17 is fitted are coaxially pivoted to the first substrate 31 by a common shaft 37. The second lens pin 16a and the third lens pin 17a are always in contact with the surface of the rear side of the cam groove (adjacent the CCD image pickup device 18) through the tensile springs 16b and 17b, respectively, to eliminate backlash.

There is a gear mechanism 38 which transmits the rotation of the second lens stepping motor M2 to the second lens drive plate 35, a gear mechanism 39 which transmits the rotation of the third lens stepping motor M3 to the third lens drive plate 36, and a volume mechanism (variable resistor) associated with the third lens drive plate 36, between the first and second mother plates 31 and 32. The lens controller 70 receives the resistance of the volume mechanism and converts the same into position data of the third lens group L3.

Figure 3:
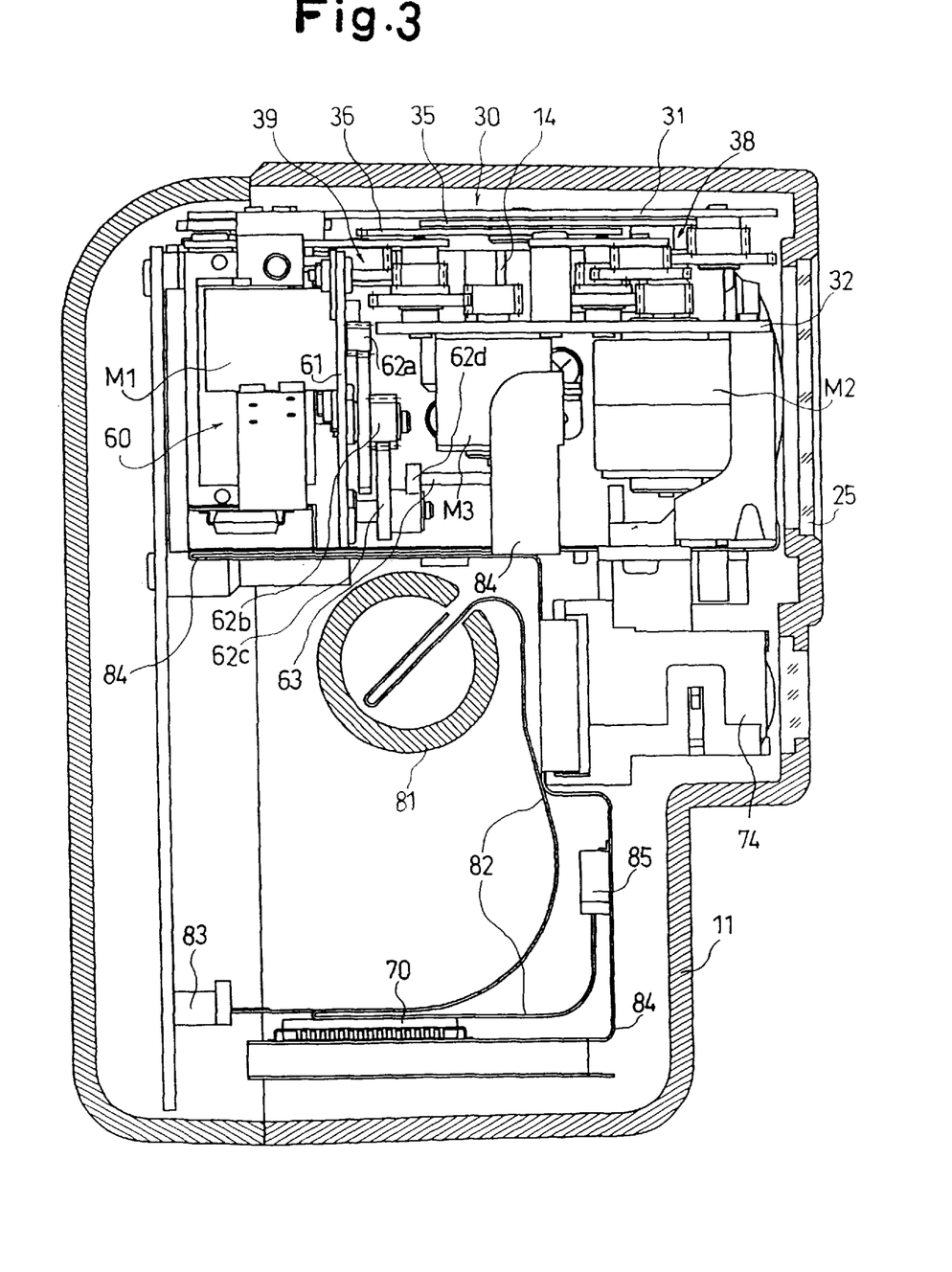
FIG. 3 is a right side view of the zoom lens portion of FIG. 2.
Figure 4:
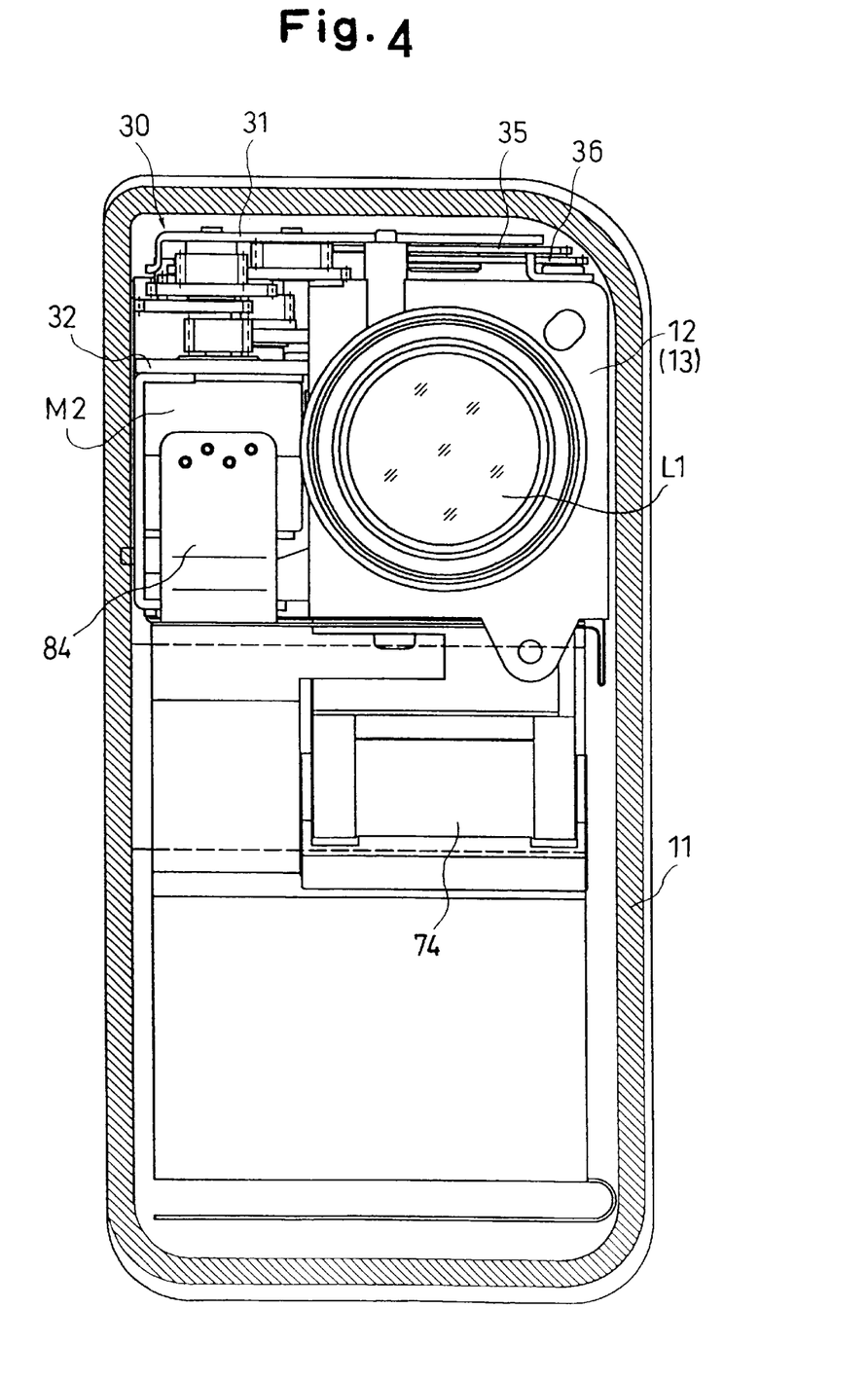
FIG. 4 is a front elevational view of the zoom lens portion of FIG. 2.

In FIG. 3, numeral 60 designates a diaphragm drive unit which drives the diaphragm block 14 held between the front body 12 and the rear body 13. The diaphragm block 14 is secured between the first and second bodies 12 and 13 through the substrate 50. The diaphragm block 50 is provided with a retainer 52 secured to the substrate 50, diaphragm blades 53, an opening and closing ring 54 which opens or closes the diaphragm blades 53, and a photosensor (not shown) as a position detector which detects the position of the origin (full-open position) of the diaphragm blades 53. The lens controller 70 detects the original position of the diaphragm block 14 (diaphragm mechanism) through the photosensor.

The diaphragm drive unit 60 forms a separate unit which is secured to the rear body 13 at positions different from the diaphragm block 14 in the optical axis direction and the radial direction. The diaphragm stepping motor M1 is secured to the substrate 61 of the drive unit 60. The first gear 62a of the drive shaft thereof is functionally connected to the sector gear 62c through the second gear 62b. The sector gear 62c is provided with a radial arm integral therewith, which is in turn provided with an association pin 63 which is fitted in the radial groove of the opening and closing ring 54. Namely, when the diaphragm stepping motor M1 rotates so that the radial arm 62d is rotated, the opening and closing ring 54 is rotated to open or close the diaphragm blades 53. The diaphragm stepping motor M1 is stopped at the detent position.

The lens casing 11 is connected to the body casing (not shown) through the cylindrical boss 81 (FIGS. 2 and 3) at the substantially center portion so as to rotate by an angle less than 360°. The body casing is equipped with the zoom switch, the release switch, the signal processing circuit, the memory, a liquid crystal display (LCD) panel with a finder function, in which the object image formed on the CCD 18 is displayed, a body CPU, and various function switches. The electric circuits in the body casing are connected to the electric circuits in the lens casing 11 through a bodylens connecting FPC board 82 which extends through the cylindrical boss 81. Namely, the FPC board 82 connected to the CPU within the body casing is connected to a connector 83 provided on the substrate 20 and a connector 85 provided on an FPC board 84 on the lens side, through the cylindrical boss 81. The FPC board 84 on the lens side is provided with a printed circuit to which all the electrical elements within the casing 11 are connected and electronic devices such as the lens CPU 70.

The focal position of the zoom lens, i.e., the position of the second lens group L2 is can be definitely determined in accordance with the position of the third lens group L3 (set focal length) and the object distance measured by the focus detecting device 74.

The position of the second lens group L2 (number of the drive pulses of the second lens stepping motor from its initial position) determined in accordance with the focal length and the object distance is obtained in advance by calculation or by measurement and is shown in a table stored for example in an EEPROM 100. The stored data can be read upon photographing, so that the position of the second lens group L2, i.e., the number of the drive pulses from the initial position, can be set.

In the illustrated embodiment, two tables 1, 2 for the fine drive control (high precision drive control) at an angular displacement precision of one step, (photographing operation) and for the normal drive control at an angular displacement precision of two steps (other than the photographing operation) are prepared. Namely, in Table 1 for the high precision drive control, the number of the drive pulses of the second lens stepping motor M2 is represented by an integer and in Table 2 for the normal drive control, the number of the drive pulses of the second lens stepping motor M2 is represented by even numbers. Upon photographing, Table 1 is used to set the number of the drive pulses of the second lens stepping motor M2. Table 2 is used to set the number of the drive pulses of the second lens stepping motor M2 when no photographing operation is carried out.

Likewise, the relationship between the appropriate diaphragm values based on the measurement by the photometering device 73 and the number of the drive pulses of the diaphragm stepping motor M1 is shown in a table stored in EEPROM 100. The number of the drive pulses is read from the table when the diaphragm stepping motor M1 is driven. In the illustrated embodiment, for the number of the drive pulses of the diaphragm stepping motor M1, two diaphragm tables (tables 3 and 4) for the high precision drive control at an angular displacement precision of one step, and for the normal drive control at an angular displacement precision of even numbered steps are prepared. Table 3 is used upon photographing, and Table 4 is used for operations other than the photographing operation.

In case of the drive at even-numbered stepped angular-units, the set number is defined by an integer. If the number is odd, it can be rounded up or down. In general, in case of a photographing lens, the depth of field is larger for long distances than for short distances. Consequently, the CCD image pickup device is subject to over-exposure, the image may be collapsed or a smear may be caused due to overflow. To solve this, in the illustrated embodiment, since the second lens stepping motor M2 moves the second lens group L2 from the infinite focal position to the close focal position, the round-up operation is carried out. However, since the diaphragm stepping motor M1 moves the diaphragm blades 53 from the open position to the closed position, the round-up operation is carried out.

Figure 6:
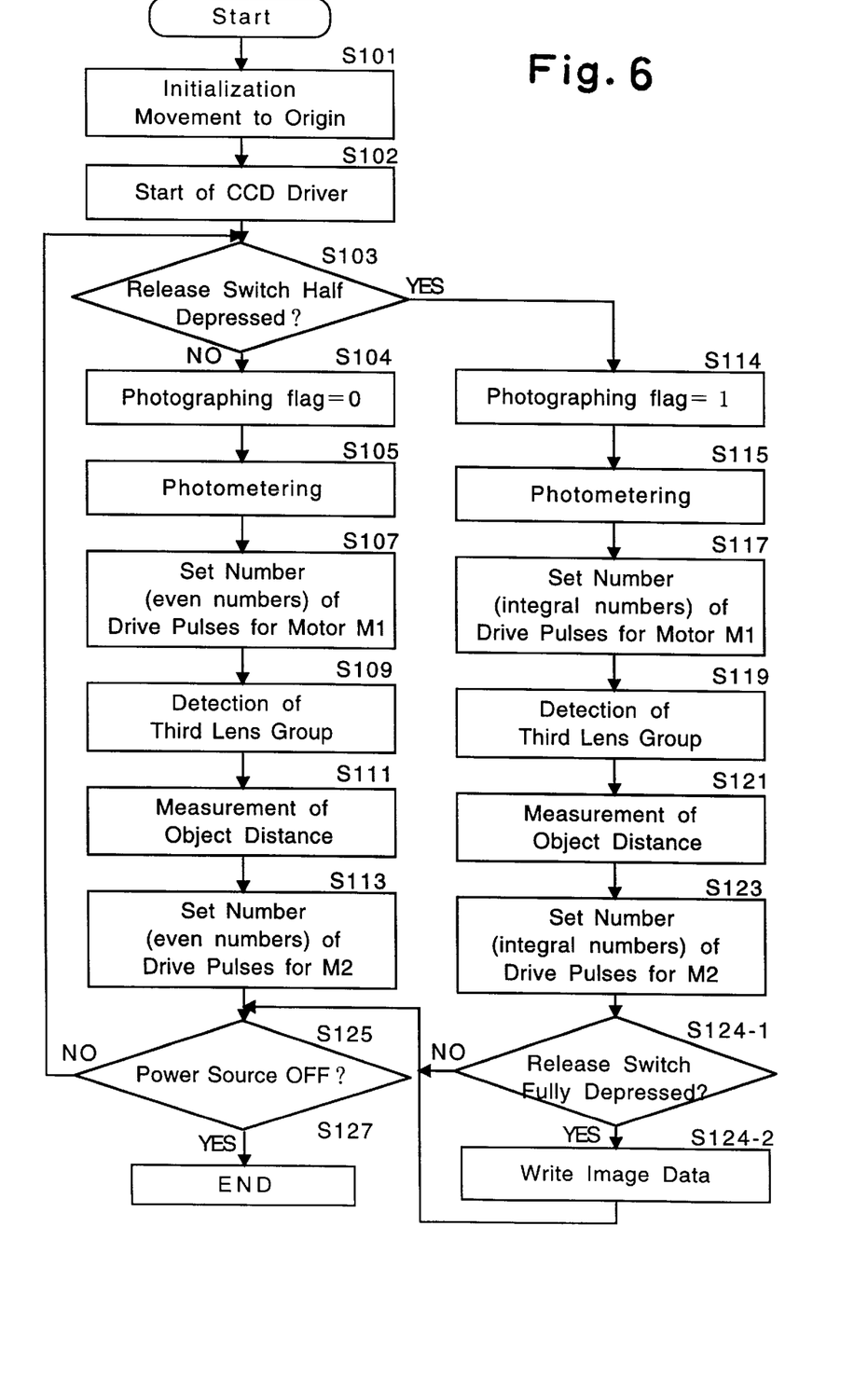
FIG. 6 is a flow chart of the basic operation of a digital still camera to which the present invention is applied.

The lens controller 70 operates as follows. FIG. 6 shows a flow chart of the operation of an embodiment in which the photometering operation and the focusing operation are repeatedly carried out when the power switch 93 is ON. In this embodiment, while the power switch is ON, the motors M1 and M2 are driven at even-numbered stepped angular-units in accordance with the normal drive control, and if the release switch 72 is depressed by half a step, the motors M1 and M2 are driven by one-step angular units, in accordance with the high precision drive control. In the illustrated embodiment, when the release switch 72 is depressed by a full step, the image data is written in the image-data memory 76.

When the power switch is turned ON (photographing mode is set), the lens controller 70 initializes the internal RAM, to drive the motors Ml, M2 and M3. Consequently, the diaphragm blades 53 are opened to the initial position (open position) and the second and third lens groups L2 and L3 are moved to the origin (initial position). The movement of the motors M1, M2 and M3 is stopped at the detent position (1-phase excitation position) (S101). Thereafter, the image pickup operation by the CCD image pickup device 18 is carried out by the CCD driver 77 (S102). In the illustrated embodiment, the CCD driver 77, once driven, continues the image pickup operation until it receives a stop signal or the power supply is stopped.

A check is made to determine whether the release switch 72 has been depressed by half step (S103). If the release switch 72 is not ON, i.e., if a photographing operation is not being carried out, the operations beginning at S104 are performed (S103, No; S104 through S113). If the release switch 72 is depressed by half step, i.e., if the photographing position is carried out, the operations from S114 to S123 are carried out (S103, Yes; S114 through S123).

<Normal Drive Control (Operation other than Photographing Operation)>

The operation when the release switch 72 has not been depressed by a half-step is as follows. The photographing flag which is used to discriminate whether or not the photographing operation is to be carried out is set to "0" (S104). When the photographing flag is "0", Table 4 is selected, so that the number of the drive pulses of the motors M1 and M2 is set to be even numbers.

The object brightness is measured by the photometering device 73 (S105), and consequently, a diaphragm value to obtain an optimal quantity of light for exposure is set in accordance with the measured object brightness to determine the number (even number) of drive pulses of the diaphragm stepping motor M1 to move the diaphragm from the initial position (S107)

Thereafter, the absolute position of the third lens group L3 is detected by the third lens volume 40 (S109), and the object distance is detected by the focus detecting device 74 (S111). Consequently, the position of the second lens group L2 is set in accordance with the measured object distance and the position data of the third lens group L3 to determine the number (even numbers) of drive pulses of the second lens stepping motor M2 to move the second lens group L2 from the initial position (S113). T he operations from S104 to S113 are repeated until the power source is turned OFF (S125, No; S103 through S113; S125).

<High Precision Drive Control (Photographing Operation)>

The operation when the release switch 72 has been depressed by a half-step is as follows.

The photographing flag which is used to discriminate whether or not the photographing operation is to be carried out is set to "1" (S114). When the photographing flag is "1", Tables 3 are selected. Consequently, the number of the drive pulses of the motors M1 and M2 is set as an integer, regardless of whether it is an even or an odd number, so that the motors can be driven by one-step angular units.

The object brightness is measured by the photometering device 73 (S115), and consequently, a diaphragm value to obtain an optimal quantity of light for exposure is set in accordance with the measured object brightness to determine the number (an even or odd number) of drive pulses of the diaphragm stepping motor M1 to move the diaphragm from the initial position (S117).

Thereafter, the absolute position of the third lens group L3 is detected by the third lens volume 40 (S119), and the object distance is detected by the focus detecting device 74 (S121). Consequently, the position of the second lens group L2 is set in accordance with the measured object distance and the position data of the third lens group L3 to determine the number (an even or odd number) of drive pulses of the second lens stepping motor M2 to move the second lens group L2 from the initial position (S123).

Thereafter, a check is made to determine whether the release switch 72 has been depressed by full step (S124-1). If the release switch 72 is depressed by a full step, the image data is written in the image-data memory 76 (S124-1, Yes; S124-2). If the release switch 72 is not depressed by a full step, the control proceeds to the step S125 (S124-1, No; S125). The operations from S114 to S124-1/S124-2 are repeated, so long as the release switch 72 is at least half depressed, until the power source is turned OFF (S125, No; S103; S114 through S124-1 [or S124-2]; S125).

If the power source is turned OFF, the termination operation is performed and the control ends (S125, Yes; S127). The termination operation includes at least the power-OFF operation and the termination operation of the CCD driver 77 and can include the movement of the motors M1, M2 and M3 to their respective initial positions.

Figure 7:
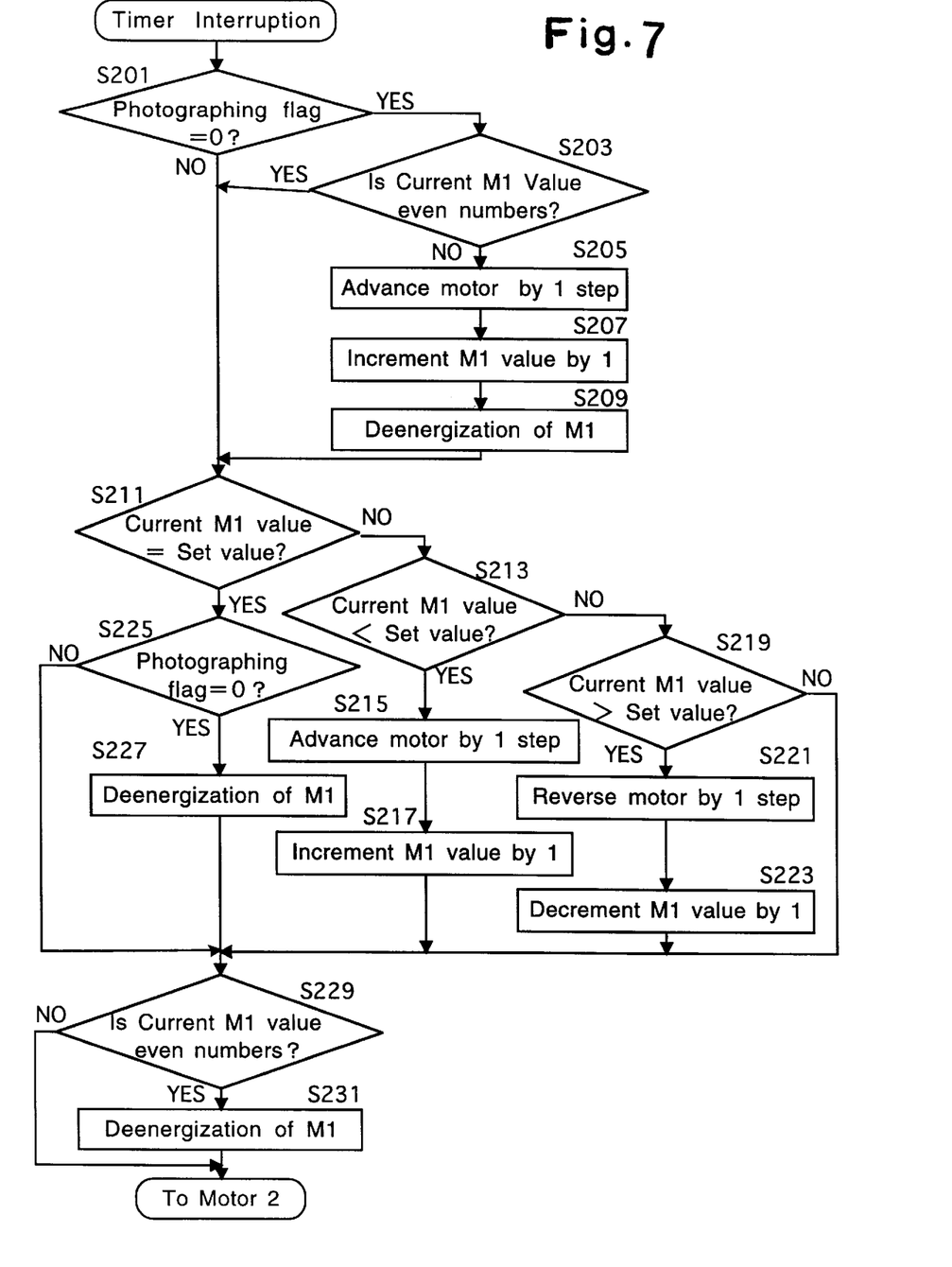
FIG. 7 is a flow chart of a stepping motor driving operation in a digital still camera to which the present invention is applied.
Figure 8:
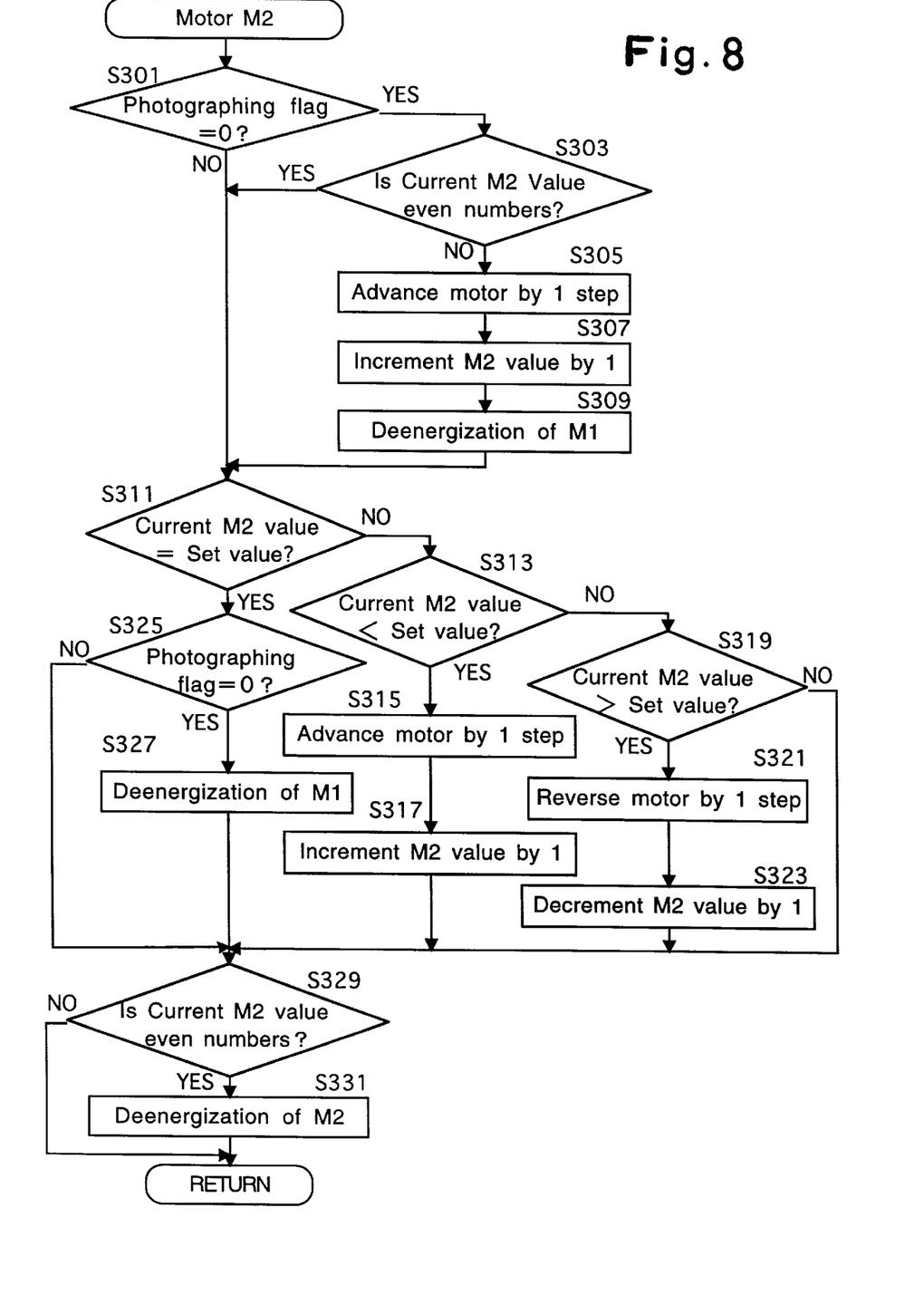
FIG. 8 is a flow chart of a stepping motor driving operation in a digital still camera to which the present invention is applied.

If the control is timer-interrupted during the operations mentioned above, the motors M1 and M2 are driven as shown in the flow charts of FIGS. 7 and 8.

<Normal Drive>

The timer-interruption during normal driving operation will be explained below. In the normal driving operation, the photographing flag is set to "0", and the set M1 and M2 values (numbers of the drive pulses) of the motors M1 and M2 are defined by even numbers. The current M1 and M2 values represent the number of the drive pulses used to drive the motors M1 and M2 from the initial positions.

If the timer-interruption occurs, a check is made to determine whether the current M1 value is an even number if the photographing flag is "0". If the current M1 value is not an even number, the diaphragm stepping motor M1 is driven by +1 (a forward step) to increase the current M1 value by one and the power supply to the diaphragm stepping motor M1 is stopped and the control proceeds to step S211 (S201, Yes; S203, No; S205; S207; S209; S211). Otherwise, the control proceeds directly to step S211 (S201, Yes; S203, Yes; S211).

Thereafter, a check is made to determine whether the current M1 value (number of the drive pulses of the diaphragm stepping motor M1) is identical to the set M1 value (S211). If the current M1 value is smaller than the set M1 value, the diaphragm stepping motor M1 is driven by +1 (a forward step) to increase the current M1 value by one (S211, No; S213, Yes; S215; S217). If the current M1 value is larger than the set M1 value, the diaphragm stepping motor M1 is driven by −1 (a reverse step) to decrease the current M1 value by one (S211, No; S213, No; S219, Yes; S221; S223).

Thereafter, a check is made to determine whether the current M1 value is an even number. If the current M1 value is an even number, the excitation of the diaphragm stepping motor M1 is stopped since the motor is in the detent position. If the current M1 value is an odd number, the control proceeds to step S301, i.e., the routine for the motor M2 shown in FIG. 8 without stopping the excitation of the diaphragm stepping motor M1, since the motor is in the 2-phase excitation position (S229; S231). Namely, if the diaphragm stepping motor M1 is in the detent position in which the current M1 value is even numbers, the excitation is stopped.

If the current M1 value (number of the drive pulses of the diaphragm stepping motor M1) is equal to the set M1 value, i.e., if the diaphragm stepping motor M1 is in the detent position in which the current M1 value is an even number, the power supply to the diaphragm stepping motor M1 is stopped and the control proceeds to the operation of the motor M2 (S211, Yes; 225, Yes; S227; S229, Yes; S231).

The second lens stepping motor M2 is driven in the same way as the diaphragm stepping motor M1. Namely, in the routine shown in FIG. 8, a check is made to determine whether the current M2 value is an even number since the photographing flag is "0" (S301, Yes). If the current M2 value is not an even number, the second lens stepping motor M2 is driven by +1 (a forward step) to increase the current M2 value by one and the power supply to the second lens stepping motor M2 is stopped and the control proceeds to step S311 (S303, No; S305; S307; S309; S311), otherwise, the control proceeds to step S311 (S303, Yes; S311).

Thereafter, a check is made to determine whether the current M2 value (number of the drive pulses of the second lens stepping motor M2) is identical to the set M2 value (S311). If the current M2 value is smaller than the set M2 value, the second lens stepping motor M2 is driven by +1 (a forward step) to increase the current M2 value by one (S311, No; S313, Yes; S315; S317). If the current M2 value is larger than the set M2 value, the second lens stepping motor M2 is driven by −1 (a reverse step) to decrease the current M2 value by one (S311, No; S313, No; S319, Yes; S321; S323).

Thereafter, a check is made to determine whether the current M2 value is an even number. If the current M2 value is an even number, the excitation of the second lens stepping motor M2 is stopped since the motor is in the detent position. If the current M2 value is an odd number, the control is returned without stopping the excitation of the second lens stepping motor M2, since the motor is in the 2-phase excitation position (S329; S331). Namely, if the second lens stepping motor M2 is in the detent position in which the current M2 value is an even number, the excitation is always ceased.

If the current M2 value (number of the drive pulses of the second lens stepping motor M2) is equal to the set M2 value, i.e., if the second lens stepping motor M2 is in the detent position in which the current M2 value is an even number, the power supply to the second lens stepping motor M2 is stopped and the control is returned (S311, Yes; 325, Yes; S327; S329, Yes; S331).

As can be seen from the foregoing, according to the present invention, at the normal driving operation other than the photographing operation, the motors M1 and M2 are driven by even-numbered stepped angular-units and are always stopped at the detent position by stopping the power supply to the motors at even-numbered stepped angular-units. Thus, the stop position can be precisely controlled while reducing the power consumption.

The high precision drive operation upon photographing will be discussed below. In the high precision drive control, the motors M1 and M2 are driven by one-step angular-units and are stopped at an equilibrium position (odd-numbered step position) other than the detent position without stopping the excitation thereof. Upon completion of the photographing operation, the motors are moved to the detent positions (even-number step position), and thereafter, the excitation is ceased.

<High Precision Drive>

The high precision drive operation will be discussed below. Unlike the normal drive, in the high precision drive, the photographing flag is set to "1" at step S114, and the set M1 and M2 values corresponding to the numbers of the drive pulses of the motors M1 and M2 could be odd numbers.

In the timer-interruption, since the photographing flag is "1", a check is made to determine whether the current M1 value (number of drive pulses used to drive the diaphragm stepping motor M1) is identical to the set M1 value (S201, No; S211). If the values are different, the operations same as those of the normal drive are carried out.

If the current M1 value is equal to the set M1 value, since the photographing flag is "1", the control skips the operation at step S227 (termination of the power supply) and proceeds to step S229 to check whether or not the current M1 value is an even number (S211, Yes; S225, No; S229). If the current M1 value is an even number, the excitation of the diaphragm stepping motor M1 is stopped since the motor is in the detent position. Thereafter, the control proceeds to the operation for the motor M2 (S229, Yes; S231). If the current M1 value is an odd number, the 2-phase excitation is maintained, i.e., excitation of the diaphragm stepping motor M1 is not stopped, since the motor M1 is not in the detent position. Consequently, the diaphragm stepping motor M1 and accordingly the diaphragm blades 53 are held in the odd-number step position (2-phase excitation position), so that an optimum quantity of light can be obtained through the CCD image pickup device 18.

The second lens stepping motor M2 is driven in the same way as the diaphragm stepping motor M1. Namely, in the routine shown in FIG. 8, a check is made to determine whether or not the current M2 value (number of the drive pulses used to drive the second lens stepping motor M2) is identical to the set M2 value (S301, No; S311) since the photographing flag is "1". If the current M2 value is not identical to the set M2 value, the same operations as those in the normal drive are effected.

If the current M2 value is equal to the set M2 value, since the photographing flag is "1", the control skips the operation at step S327 (termination of the power supply) and proceeds to step S329 to check whether or not the current M2 value is an even number (S311, Yes; S325, No; S329). If the current M2 value is an even number, the excitation of the second lens stepping motor M2 is stopped since the motor is in the detent position. Thereafter, the control is returned (S329, Yes; S331). However, if the current M2 value is an odd number, the 2-phase excitation is maintained, i.e., no excitation of the second lens stepping motor M2 is stopped, since the motor M2 is not in the detent position. Consequently, the second lens stepping motor M2 and accordingly the second lens group L2 are held in the odd-number step position (2-phase excitation position), so that an in-focus image can be formed by the CCD image pickup device 18.

<Return Operation after Motors are stopped at the odd-number Step Position in High Precision Drive>

In the timer-interruption operation, the operations at steps S203 through S209 and the operations at steps S303 through S309 for the motor M2 are those for returning the stepping motors M1 and M2 to the even-number step positions (1-phase excitation positions or the detent positions) when the release switch 72 is turned OFF after the stepping motors M1 and M2 have been stopped at the odd-number step positions (2-phase excitation positions, or non-detent positions) when the release switch 72 has been depressed by half step upon photographing.

If the release switch 72 is turned OFF, the photographing flag is set to "0" at step S104. Consequently, the control proceeds to step S203 (or S303) from step S201 (or S301) when the control enters the timer-interruption operation.

If the current M1 value is an odd number, i.e., if the diaphragm stepping motor M1 is stopped at the odd-number step position (2-phase excitation position or non-detent position), the diaphragm stepping motor M1 receives a 2-phase excitation. Therefore, the diaphragm stepping motor M1 is driven by +1 (a forward step) toward the detent position to increase the current M1 value by one. Thereafter, the excitation is stopped (S201, Yes; S203, No; S205; S207; S209).

Likewise, if the current M2 value is an odd number, i.e., if the second lens stepping motor M2 is stopped at the odd-number step position (2-phase excitation position or non-detent position), the second lens stepping motor M2 receives a 2-phase excitation. Therefore, the second lens stepping motor M2 is driven by +1 (a forward step) toward the detent position to increase the current M2 value by one. Thereafter, the excitation is stopped (S301, Yes; S303, No; S305; S307; S309).

Thus, a highly precise drive at odd numbers of drive pulses can be carried out upon photographing, and upon completion of the photographing operation, the excitation is ceased when the motors are moved to an even number pulse position in which no excitation is needed. Consequently, power consumption can be reduced.

The lens controller 70 performs the interruption operation to drive the motors M2 and M3 at two-step angular units when the zoom switch 71 is depressed during the repetition of the above mentioned operations. The motor drive operation upon zooming will be discussed below. In the telephoto position shown in FIG. 5, if the zoom switch 71 is moved toward the wide angle position, the lens controller 70 drives the second and third lens stepping motors M2 and M3 at two-step angular units as a result of the interruption operation to thereby move the second and third lens frames 16 and 17 (second and third lens groups L2 and L3) forward and rearward, respectively. The lens controller 70 decreases the current M2 and M3 values by two every time the motors M2 and M3 are driven by two steps. The lens controller 70 stops the motors M2 and M3 when the zoom switch 71 is turned OFF, i.e., when the lens controller 70 receives the stop signal. Since the current M2 and M3 values are even numbers, i.e., the motors are in the detent position (1-phase excitation position), the excitation is ceased.

If the zoom switch is moved toward the telephoto direction, the lens controller 70 drives the second and third lens stepping motors M2 and M3 at one-step angular units to move the second and third lens frames 16 and 17 (second and third lens groups L2 and L3) rearward and forward, respectively, due to the interruption. The lens controller 70 increases the current M2 and M3 values by two every time the motors M2 and M3 are driven by two steps. When the second or third lens frame 16 or 17 reaches the telephoto extremity, or the zoom switch 71 is turned OFF, i.e., the lens controller receives the stop signal, the lens controller 70 stops the power supply to the second lens stepping motor M2 and the third lens stepping motor M3 to thereby stop the operation thereof at the 1-phase excitation position in which the current M2 and M3 values are even numbers.

Note that since the position of the third lens group L3 is detected by the third lens volume 40, it is not necessary to count the number of the drive pulses of the third lens stepping motor M3.

The lens controller 70 drives the diaphragm stepping motor M1 and the second lens stepping motor M2 according to the high precision control, based on the focal length set by the zooming operation. The number of the drive pulses of the diaphragm stepping motor M1 is set in accordance with the object brightness measured by the photometering device 73, so that the position of the diaphragm blades 53 are moved to the set diaphragm value position by the diaphragm stepping motor M1 which is driven from its initial position (detected by the diaphragm origin sensor 55) in accordance with the number of the drive pulses. Likewise, the number of the drive pulses of the second lens stepping motor M2 is set in accordance with the set focal length data and the object distance data measured by the focus detecting device 74. Consequently, the second lens stepping motor M2 is driven from its initial position (detected by the second lens origin sensor 22) in accordance with the number of the drive pulses to move the second lens group L2 along the optical axis to thereby focus the lens on the object. Namely, if the position of the third lens group L3 (focal length) is set by the zoom switch 71, the position of the second lens group L2 can be definitely determined in accordance with the set focal length and the object distance measured by the focus detecting device 74. Thus, an in-focus object image can be formed on the CCD image pickup device 18.

If the camera structure is such that the photometering device 73 and the focus detecting device 74 are actuated according to the normal drive control and at the high precision drive control when the release switch 72 is depressed by half step and full step, respectively, the service life of the battery can be increased.

As can be understood from the above discussion, according to the present invention, the 1–2 phase excitation stepping motors M1, M2 and M3 are driven at even-numbered stepped angular-units when no photographing operation is carried out, and the stepping motors are stopped always at the detent positions. Thus, the power consumption of the battery can be reduced. Moreover, since the stepping motors M1 and M2 are driven at one-step angular units when the photographing operation is carried out, a precise control of the quantity of incident light and a precise focus control can be achieved. Therefore, in particular, if the present invention is applied to a digital still camera having a liquid crystal display, the normal drive control can be used when the object is viewed, so that the battery power consumption can be reduced without deteriorating the image quality which is viewed through the LCD. Furthermore, the high precision drive control can be used when the photographing operation is carried out, i.e., the image data of the picked-up image is written in the memory, so that the quantity of light to be received and the focal position can be precisely controlled, thus resulting in a high quality image.

Although the ON/OFF state of the release switch 71 is detected by the lens controller 70 in the above-mentioned embodiments, if the detachable zoom lens portion is attached to the camera body portion, it is possible to detect the ON/OFF state of the release switch 71 by means of the body controller provided in the camera body, so that the ON signal of the release switch can be transmitted through the data communication system between the lens controller and the body controller. In this alternative, a check is made at step S103 to determine whether the ON signal is received. Alternatively, it is also possible to transmit the photographing flag from the body controller to the lens controller through the data communication.

Although the above discussion has been directed to a digital still camera having three 1–2 phase excitation stepping motors, the present invention is not limited thereto and can be applied to a camera having a 1–2 phase excitation stepping motor in general. Moreover, although the detachable zoom lens portion having a photographing lens is attached to the camera body portion having an image data storing means in the illustrated embodiment, the present invention can be applied to a digital still camera in which the zoom lens portion and the camera body portion are formed as one body.

As may be understood from the above discussion, according to the present invention, in a camera having 1–2 phase excitation type stepping motors, the stepping motors are driven at one-step angular units in the high precision drive control, but in the normal drive control in which no high precision is needed, the stepping motors are driven at even-numbered stepped angular-units and are stopped at the detent positions by stopping the power supply thereto. Thus, the power consumption of the battery can be decreased while ensuring the high precision drive. Furthermore, if the stepping motors are used to control the focus, the service life of the battery can be extended while ensuring the focus control at a high precision.

What is claimed is:

1. A stepping motor driving apparatus for a camera, comprising:

a digital still camera having an image pickup device, a memory capable of storing image data produced by said image pickup device, and a display capable of displaying said image data;

a 1–2 phase excitation type stepping motor;

said camera having a mode of normal drive control and high precision drive control of said camera;

a drive controller which drives said stepping motor by 1–2 phase excitation;

wherein, when said camera is in said mode of normal drive control responsive to image data being displayed on said display but not being recorded in said memory, said drive controller always stops said stepping motor at a 1-phase excitation position by de-energizing said stepping motor at said 1-phase excitation position, and wherein, when said camera is in said mode of high precision control responsive to image data being recorded in said memory, said drive controller stops said stepping motor at one of said 1-phase excitation position and a 2-phase excitation position without stopping excitation of said stepping motor.

2. A stepping motor driving apparatus for a camera, according to claim 1, wherein said stepping motor is adapted to move a focusing lens group of a photographing lens, and wherein said drive controller drives said stepping motor according to said high precision drive control upon photographing, and drives said stepping motor according to said normal drive control for operations other than said photographing operation.

3. A stepping motor driving apparatus according to claim 2, wherein when said stepping motor is stopped at said 2-phase excitation position while maintaining said 2-phase excitation upon photographing, said drive controller stops said stepping motor by de-energizing said stepping motor when another 1-phase excitation of said stepping motor occurs upon completion of said photographing operation.

4. A stepping motor driving apparatus according to claim 2, further comprising a calculation system for calculating said number of said drive pulses to drive said stepping motor, wherein said number of said drive pulses is represented by an integer for said photographing operation and by an even number for operations other than said photographing operation.

5. A stepping motor driving apparatus according to claim 1, wherein said stepping motor is adapted to open or close a diaphragm of a photographing lens, and wherein said drive controller drives said stepping motor according to said high precision drive control upon photographing, and drives said stepping motor according to said normal drive control for operations other than said photographing operation.

6. A stepping motor driving apparatus according to claim 5, wherein when said stepping motor is stopped at said 2-phase excitation position while maintaining said 2-phase excitation upon photographing, said drive controller stops said stepping motor by de-energizing said stepping motor when another 1-phase excitation of said stepping motor occurs upon completion of said photographing operation.

7. A stepping motor driving apparatus according to claim 5, further comprising a calculation system for calculating said number of said drive pulses to drive said stepping motor, wherein said number of said drive pulses is represented by an integer for said photographing operation and by an even number for operations other than said photographing operation.

8. A stepping motor driving apparatus according to claim 7, wherein said drive controller always commences with a 2-phase excitation from said 1-phase excitation position driving the stepping motor one step at a time.

9. The stepping motor driving apparatus according to claim 1, said image pickup device comprising a CCD image pickup device, said display comprising a liquid crystal display.

10. The stepping motor driving apparatus according to claim 1, further comprising a first table storing drive data for said high precision control mode and a second table storing drive data for said normal drive control mode.

11. The stepping motor driving apparatus according to claim 10, said first table containing data for drive control at an angular displacement of one step and said second table containing data for drive control at an angular displacement of two steps.

12. The stepping motor driving apparatus according to claim 11, wherein a number of drive pulses of the stepping motor according to said first table is represented by an integer, and a number of drive pulses of said stepping motor according to said second table is represented by even numbers.

13. The stepping motor driving apparatus according to claim 12, said stepping motor driving a lens group of a zoom photographing lens, said lens group comprising a focusing lens group.

* * * * *